(No Model.)
J. L. LORD.
COUNTER SEAT.
No. 545,804. Patented Sept. 3, 1895.
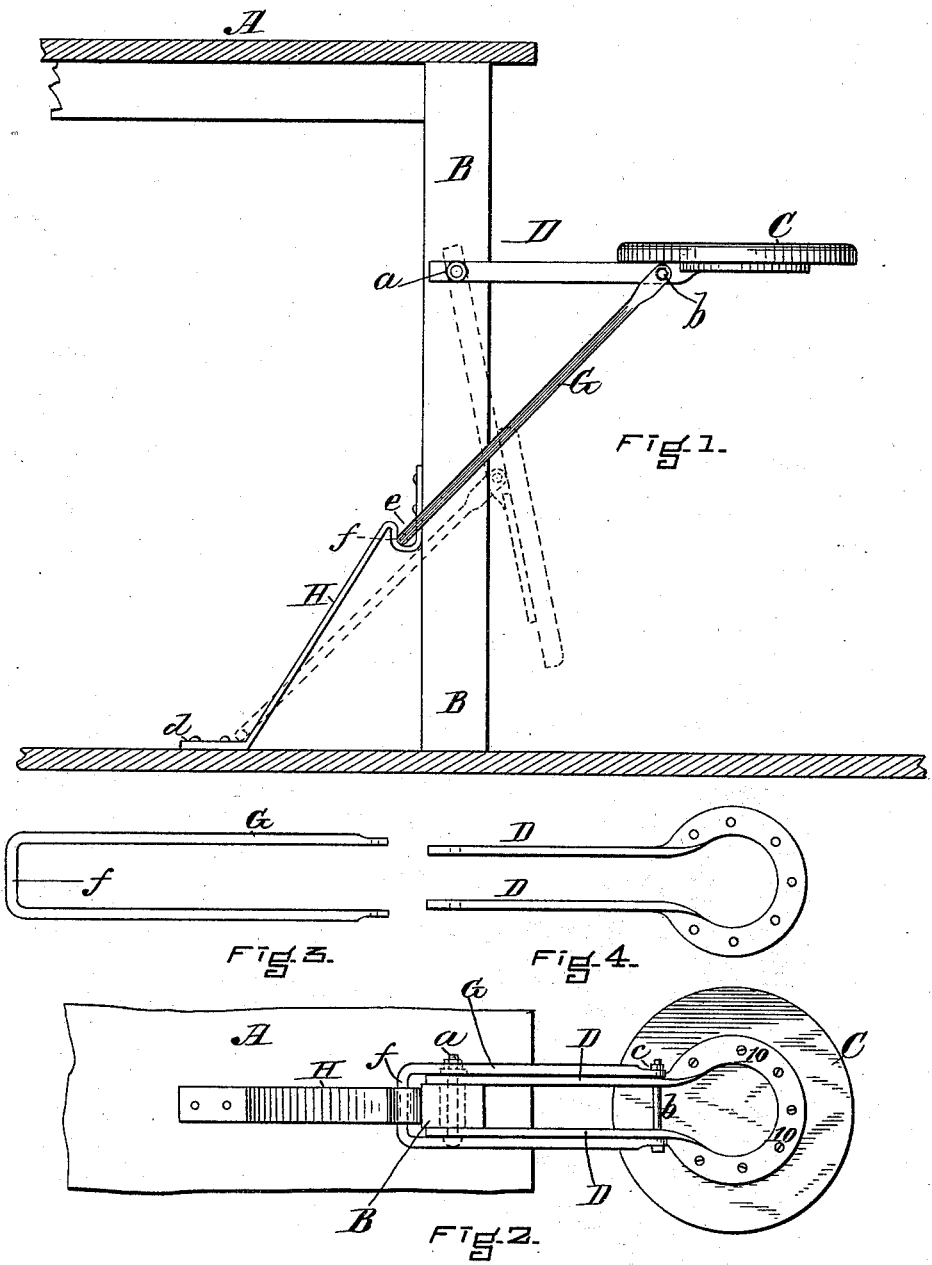
WITNESSES
INVENTOR
John L. Lord

UNITED STATES PATENT OFFICE.

JOHN L. LORD, OF MEDFORD, MASSACHUSETTS.

COUNTER-SEAT.

SPECIFICATION forming part of Letters Patent No. 545,804, dated September 3, 1895.

Application filed January 26, 1895. Serial No. 536,359. (No model.)

*To all whom it may concern:*

Be it known that I, JOHN L. LORD, a citizen of the United States, residing at Medford, in the county of Middlesex and State of Massachusetts, have invented certain Improvements in Counter-Seats for Stores, of which the following is a full, clear, and exact description, reference being had to the accompanying drawings, making a part of this specification, in which—

Figure 1 is a side elevation of my improved seat applied to a store-counter and in a position for use. Fig. 2 is an underneath view of the same. Figs. 3 and 4 are details to be referred to.

My invention has for its object to provide a strong seat of simple construction which is especially adapted for use behind store counters or tables and which can be readily dropped or folded down out of the way when not required for use.

To this end my invention consists in a novel construction of supporting arms and braces applied to the seat and a suitable standard in such mannner as to hold the seat securely in place when raised and permit it to be easily lowered down out of the way, as hereinafter more fully set forth, and specifically pointed out in the claims.

In the said drawings, A represents a store-counter, and B one of the uprights or supporting-standards at the rear of the same.

C represents the seat, to the under side of which are fastened, by screws 10 or in any other suitable manner, two supporting-arms D D, preferably formed of a single piece of metal, as shown in Figs. 2 and 4. These arms D D embrace the standard B and are pivoted thereto at their inner ends by means of a bolt *a*. G is a forked or bow-shaped brace, which also embraces the standard B and is pivoted at its open outer end to the arms D D by means of a bolt *b* passing transversely through the same and secured by a nut *c*, as shown in Fig. 2, or if preferred the ends of the brace may be independently pivoted to lugs or ears secured to the under side of the seat.

H is a stationary angle-brace, which is secured at its upper end to the inner side of the standard B and at its lower end to the floor at *d*, and at the upper end of this brace is formed an open or hook-shaped socket *e*, Fig. 1, for the reception of the transverse bar *f*, Fig. 3, of the bow-shaped brace G, which drops into or engages said socket when the seat is lifted up into a horizontal position for use, as shown in Fig. 1, the parts being then locked securely in place. When the seat is not required for use and is to be dropped down out of the way, it is merely necessary to lift the brace G with the hand sufficiently to raise its bar *f* out of the socket *e*, when it will slide down the upper inclined side of the angle-brace H, the seat then assuming the position shown dotted in Fig. 1. When the seat is raised or swung up on its pivot *a* by taking hold of the same with the hand, it will be seen that the bar *f* of the brace G will slide up on the brace H, which thus acts as a guide to direct the bar *f* into the socket *e* without any care or attention on the part of the person who is raising the seat.

The above-described seat is simple, strong, and cheap, easily attached, and not liable to get out of order, and may be used either behind or in front of the counter or applied to a table used as a counter, and instead of being attached to one of the posts or standards beneath the counter may be fastened to one of the supports or standards of the shelving at the rear of the same.

What I claim as my invention, and desire to secure by Letters Patent, is—

1. In a store counter-seat, the combination with an upright or standard, of a seat having a pair of supporting arms rigidly secured to the under side of the same, and pivoted at their inner ends to opposite sides of said standard, a swinging bow-shaped brace pivoted beneath the seat, and embracing the standard, and an open U-shaped socket secured to the standard, and adapted to receive and hold the transverse bar of the bow-shaped brace when the seat is raised to a horizontal position, substantially as set forth.

2. In a store counter-seat, the combination with an upright or standard, of the seat C, having a pair of supporting arms D, D, rigidly secured to the under side of same, and pivoted at their inner ends to opposite sides of said post or standard to permit the seat to be dropped down when not required for use, the swinging bow-shaped brace G, pivoted to the supporting arms D, D, and embracing the standard, and the stationary inclined angle brace H, extending from the said standard to the floor, and provided at its upper end with an open socket $e$, adapted to receive and hold the transverse bar $f$, of the brace G, to support the seat in a horizontal position, said brace G, sliding on the upper inclined side of the brace H, which serves as a guide to direct the bar $f$, into the socket $e$, as the seat is raised, substantially as set forth.

Witness my hand this 24th day of January, A. D. 1895.

JOHN L. LORD.

In presence of—
P. E. TESCHEMACHER,
A. E. HUMISTON.